No. 638,052. Patented Nov. 28, 1899.
C. B. HEINTZ.
DIFFERENTIAL PRESSURE GAGE.
(Application filed Sept. 19, 1899.)
(No Model.)
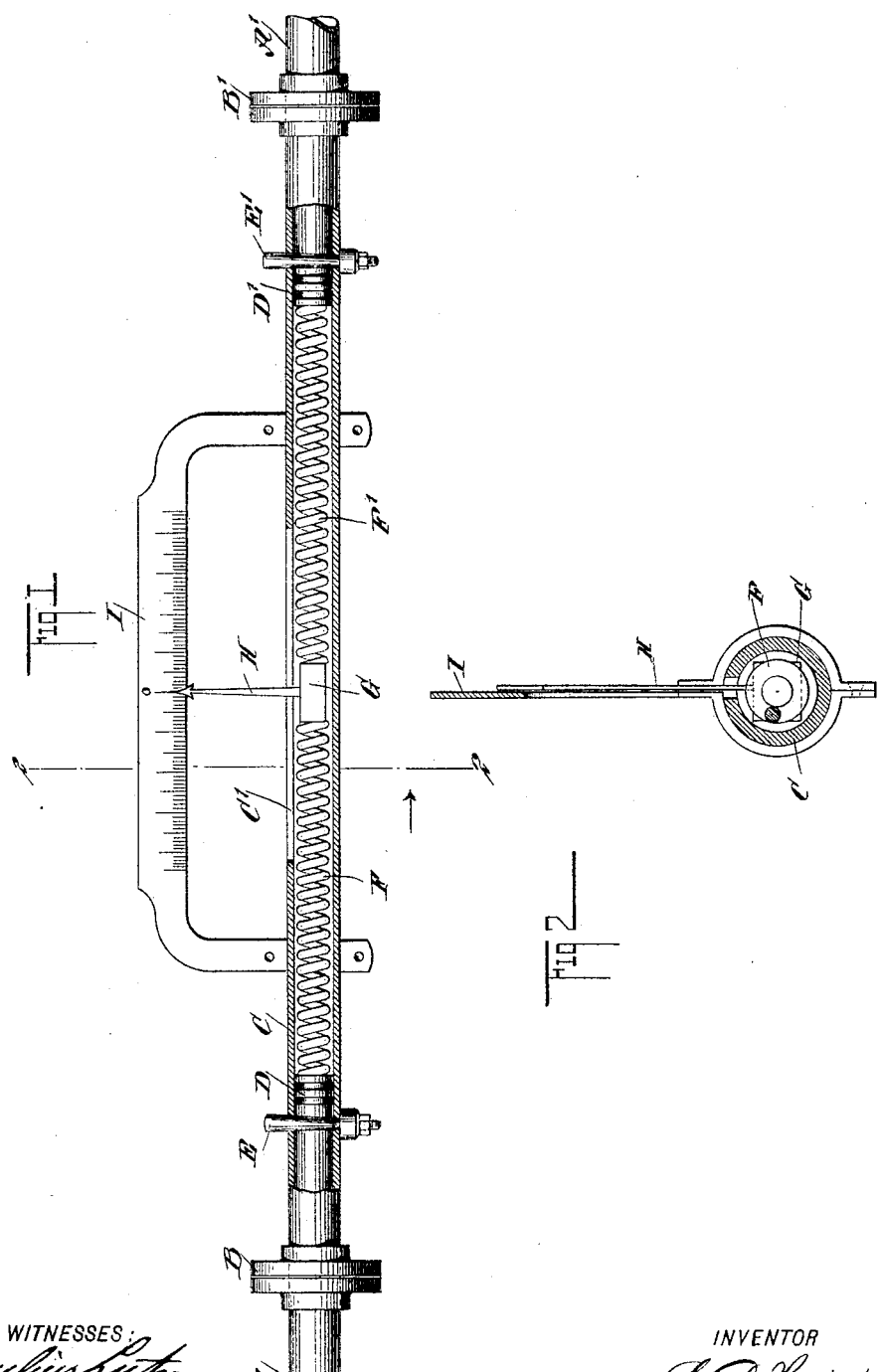

UNITED STATES PATENT OFFICE.

CHARLES B. HEINTZ, OF CLEVELAND, OHIO.

DIFFERENTIAL PRESSURE-GAGE.

SPECIFICATION forming part of Letters Patent No. 638,052, dated November 28, 1899.

Application filed September 19, 1899. Serial No. 730,982. (No model.)

*To all whom it may concern:*

Be it known that I, CHARLES B. HEINTZ, of Cleveland, in the county of Cuyahoga and State of Ohio, have invented a new and Improved Pressure-Indicator, of which the following is a full, clear, and exact description.

The object of the invention is to provide a new and improved pressure-indicator for use on engines, cylinders, pumps, and other apparatus for accurately indicating the pressure at both ends of the cylinder or in the two pump-chambers, so that in case of variation in pressure existing errors can be rectified by making necessary adjustments in the valves, &c.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in both the views.

Figure 1 is a sectional side elevation of the improvement, and Fig. 2 is an enlarged transverse section of the same on the line 2 2 in Fig. 1.

The improved pressure-indicator is connected by pipes A A' with the ends of cylinders or other apparatus, and the said pipes are connected by couplings B B' with a tube or cylinder C, as is plainly indicated in Fig. 1. In the said tube or cylinder C, at or near the ends thereof, are mounted to slide pistons D D', normally resting at their outer ends against pins E E', respectively, held in the tube or cylinder C. The inner or opposite faces of the pistons D D' are pressed on by springs F F', coiled in the tube C, their inner ends being attached to a block G and having movement in the tube lengthwise thereof, a pointer H extending from the block through a longitudinally-extending slot C', formed in the middle portion of the tube or cylinder C. The pointer H indicates on a graduation I, having zero at the middle, as shown in Fig. 1. Now by the construction described and shown in Fig. 1 the fluid under pressure can pass freely from the ends of the cylinder by way of the pipes A A' into the outer ends of the tube or cylinder C to exert pressure against the corresponding pressure-piston D or D'. The latter are now forced toward each other by the pressure exerted by the fluid, so that the springs F F' are compressed, and in case the pressure of the fluid acting on the pistons varies then one spring is more compressed than the other, and the preponderance of pressure causes a shifting of the pointer H to the right or the left of zero, according to which of the pistons D or D' is subjected to the higher pressure—that is, if the piston D is subjected to the higher pressure then the block G is moved to the right and the pointer H indicates the difference in pressure on the graduation I at the right of the zero-mark, and in case the pressure is highest on the piston D' then the pointer H moves to the left of the zero-mark to indicate the difference in pressure. In case the pressure is equal on both pistons D D' then they move like distances with corresponding equal pressure on their springs F F', so that the pointer H remains at zero on the graduation I. Thus the user of the apparatus can readily see at a glance whether there is a difference of pressure in the two ends of the cylinder or not, and if there is a difference the pointer H indicates at what end of the cylinder the preponderance of pressure is, and the amount thereof is shown by the pointer on the graduation I. From the foregoing it is also evident that the indicator also shows the slightest back pressure in the cylinder, as the pointer H cannot go back to zero unless the pressure ceases or is equal in both ends of the cylinder.

The pins E E' are preferably made tapering and drawn tight by nuts, so as to prevent leakage of pressure at the seats of the pins in the tube C. The pins E E' are sufficiently small to leave sufficient space for the fluids to reach the outer faces of the pistons D D'.

It is expressly understood that I do not limit myself to the special use of the device on engine-cylinders, as it is evident that the apparatus may be employed on pumps and other apparatus for indicating the variation of pressure in two chambers or parts.

Having thus fully described my invention, I claim as new and desire to secure by Letters Patent—

1. A pressure-indicator comprising a tube adapted to be connected at its ends with different pressure-supplies, pistons fitted to slide in said tube, springs pressing said pistons toward the ends of the tube, and a pointer for indicating variation of pressure against each piston, as set forth.

2. A pressure-indicator, comprising a tube adapted to be connected at its ends with different pressure-supplies, pistons fitted in said tube, a spring interposed between said pistons and tending to press the pistons away from each other, and a pointer for indicating variation of pressure against each piston, as set forth.

3. A pressure-indicator, comprising a tube connected at its ends with different pressure-supplies, pistons mounted to slide in the said tube, springs pressing the said pistons on the faces opposite where the pressures act on the pistons, and a pointer held on said springs and indicating on a graduation, substantially as shown and described.

4. A pressure-indicator, comprising a tube connected at its ends with different pressure-supplies, pistons mounted to slide in the said tube, springs pressing the said pistons on the faces opposite where the pressures act on the pistons, a pointer held on said springs and indicating on a graduation, and pins held in said tube, to limit the outward movement of said pistons, substantially as shown and described.

CHARLES B. HEINTZ.

Witnesses:
MICHAEL STAEBLER,
HENRY HOWARTH.